(12) United States Patent
Takeda et al.

(10) Patent No.: US 11,231,585 B2
(45) Date of Patent: Jan. 25, 2022

(54) VIRTUAL IMAGE DISPLAY APPARATUS

(71) Applicant: SEIKO EPSON CORPORATION, Tokyo (JP)

(72) Inventors: Takashi Takeda, Suwa (JP); Masayuki Takagi, Azumino (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 248 days.

(21) Appl. No.: 16/524,530

(22) Filed: Jul. 29, 2019

(65) Prior Publication Data

US 2020/0033607 A1 Jan. 30, 2020

(30) Foreign Application Priority Data

Jul. 30, 2018 (JP) .............................. JP2018-142208

(51) Int. Cl.
*G02B 27/01* (2006.01)
*G02B 17/08* (2006.01)

(52) U.S. Cl.
CPC ....... *G02B 27/0172* (2013.01); *G02B 17/086* (2013.01); *G02B 2027/011* (2013.01); *G02B 2027/013* (2013.01); *G02B 2027/0123* (2013.01); *G02B 2027/0145* (2013.01); *G02B 2027/0178* (2013.01)

(58) Field of Classification Search
CPC .... G02B 17/086; G02B 17/08; G02B 17/082; G02B 17/0836; G02B 17/084; G02B 17/0844; G02B 17/0848; G02B 17/0856; G02B 2027/011; G02B 2027/0123; G02B 2027/0145; G02B 2027/013; G02B 2027/0178; G02B 2027/0134; G02B 2027/0132; G02B 2027/0143; G02B 2027/0152; G02B 2027/0169; G02B 2027/0107; G02B 27/0176; G02B 27/0172; G02B 27/01; G02B 27/0101;
(Continued)

(56) References Cited

U.S. PATENT DOCUMENTS 6,046,857 A  4/2000 Morishima
6,493,146 B2 * 12/2002 Inoguchi ............ G02B 27/0172
                                                        359/630
(Continued)

FOREIGN PATENT DOCUMENTS

JP  H09-189880 A  7/1997

*Primary Examiner* — Travis S Fissel
(74) *Attorney, Agent, or Firm* — Oliff PLC

(57) ABSTRACT

A virtual image display apparatus includes a display device (image forming unit), a lens configured to refract imaging light from the display device, a first mirror member configured to reflect imaging light that passed through the lens, a second mirror member configured to reflect the imaging light reflected by the first mirror member, and a third mirror member of a transmissive type configured to reflect the imaging light reflected by the second mirror member toward a position of an exit pupil. The lens is asymmetric with respect to an optical axis in a first direction corresponding to an eccentric direction defined by the first mirror member and the second mirror member, and is symmetric, across the optical axis, with respect to a second direction orthogonal to the first direction.

16 Claims, 9 Drawing Sheets

(58) Field of Classification Search
CPC .. G02B 27/017; G02B 27/0178; G02B 27/04;
G02B 23/125
USPC .......................................... 359/629–633, 13
See application file for complete search history.

(56) References Cited

U.S. PATENT DOCUMENTS

| | | | | |
|---|---|---|---|---|
| 7,081,999 | B2* | 7/2006 | Yamazaki | G02B 27/0172 |
| | | | | 359/630 |
| 7,352,521 | B2* | 4/2008 | Matsunaga | G02B 13/06 |
| | | | | 353/28 |
| 2002/0044361 | A1* | 4/2002 | Scott | G02B 27/0172 |
| | | | | 359/630 |
| 2008/0055193 | A1* | 3/2008 | Tsuyuki | G02B 27/46 |
| | | | | 345/7 |
| 2013/0314303 | A1* | 11/2013 | Osterhout | G06F 3/005 |
| | | | | 345/8 |

* cited by examiner

VIRTUAL IMAGE DISPLAY APPARATUS

The present application is based on and claims priority from JP-A-2018-142208, filed Jul. 30, 2018, the disclosure of which is hereby incorporated by reference herein in its entirety.

BACKGROUND

1. Technical Field

The present disclosure relates to a head-mounted display including a mirror and the other virtual image display apparatus, and more particularly, to a virtual image display apparatus that is configured to provide see-through view.

2. Related Art

In recent years, various types of a virtual image display apparatus in which imaging light from a display element is guided to a pupil of an observer by an optical element such as a mirror and a light guide are proposed as a virtual image display apparatus, which enables formation and observation of a virtual image, like a head-mounted display.

An optical system described in JP-A-9-189880 is constituted by four eccentric curved mirrors, a first eccentric curved mirror has a rotating elliptic surface or an aspheric surface based on a rotating elliptic surface, and a second eccentric curved mirror has a hyperboloid or an aspheric surface based on a hyperboloid. Weight reduction is more easily achieved by constituting the optical system with the eccentric curved mirrors than when a light guide is used.

However, when the optical system is constituted by only the eccentric curved mirrors, optical surfaces, i.e., reflecting surfaces cannot be brought close to each other to an extent of approximately the size of itself or less. Thus, correction of an aberration is more likely to be insufficient, and resolution and the other optical performance cannot be secured, which does not facilitate increasing an angle of view.

SUMMARY

A virtual image display apparatus in one aspect of the present disclosure includes an image forming unit, a lens configured to refract imaging light from the image forming unit, a first mirror member configured to reflect imaging light that passed through the lens, a second mirror member configured to reflect the imaging light reflected by the first mirror member, and a third mirror member of a transmissive type configured to reflect the imaging light reflected by the second mirror member toward a position of an exit pupil. The lens is asymmetric with respect to an optical axis in a first direction corresponding to an eccentric direction defined by the first mirror member and the second mirror member, and is symmetric with respect to the optical axis in a second direction orthogonal to the first direction.

DESCRIPTION OF EXEMPLARY EMBODIMENTS

First Exemplary Embodiment

Next, a virtual image display apparatus according to First Exemplary Embodiment of the present disclosure will be described with reference to drawings.

Figure 1:
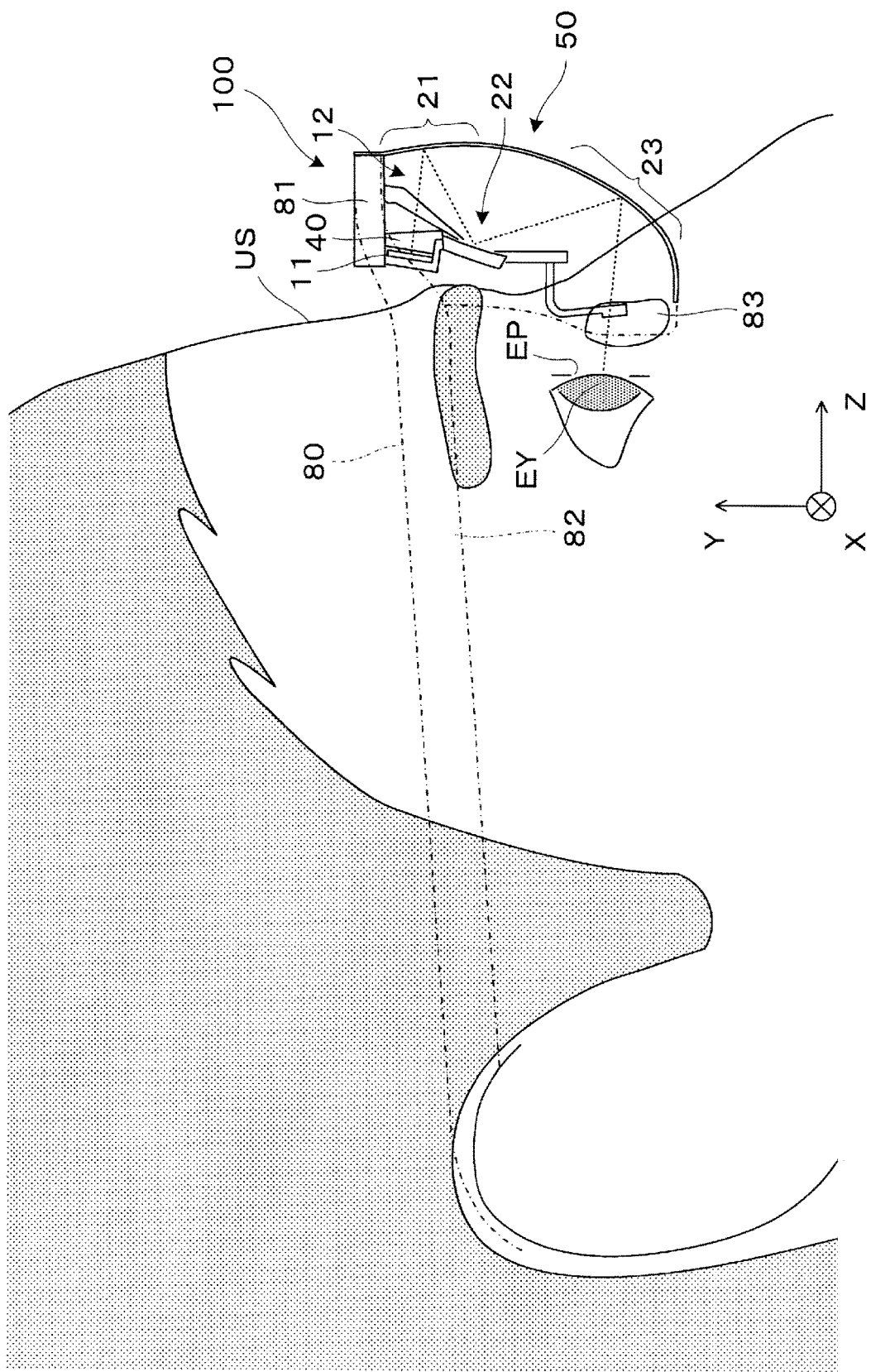
FIG. 1 is a side cross-sectional view illustrating a virtual image display apparatus according to First Exemplary Embodiment.
Figure 2:
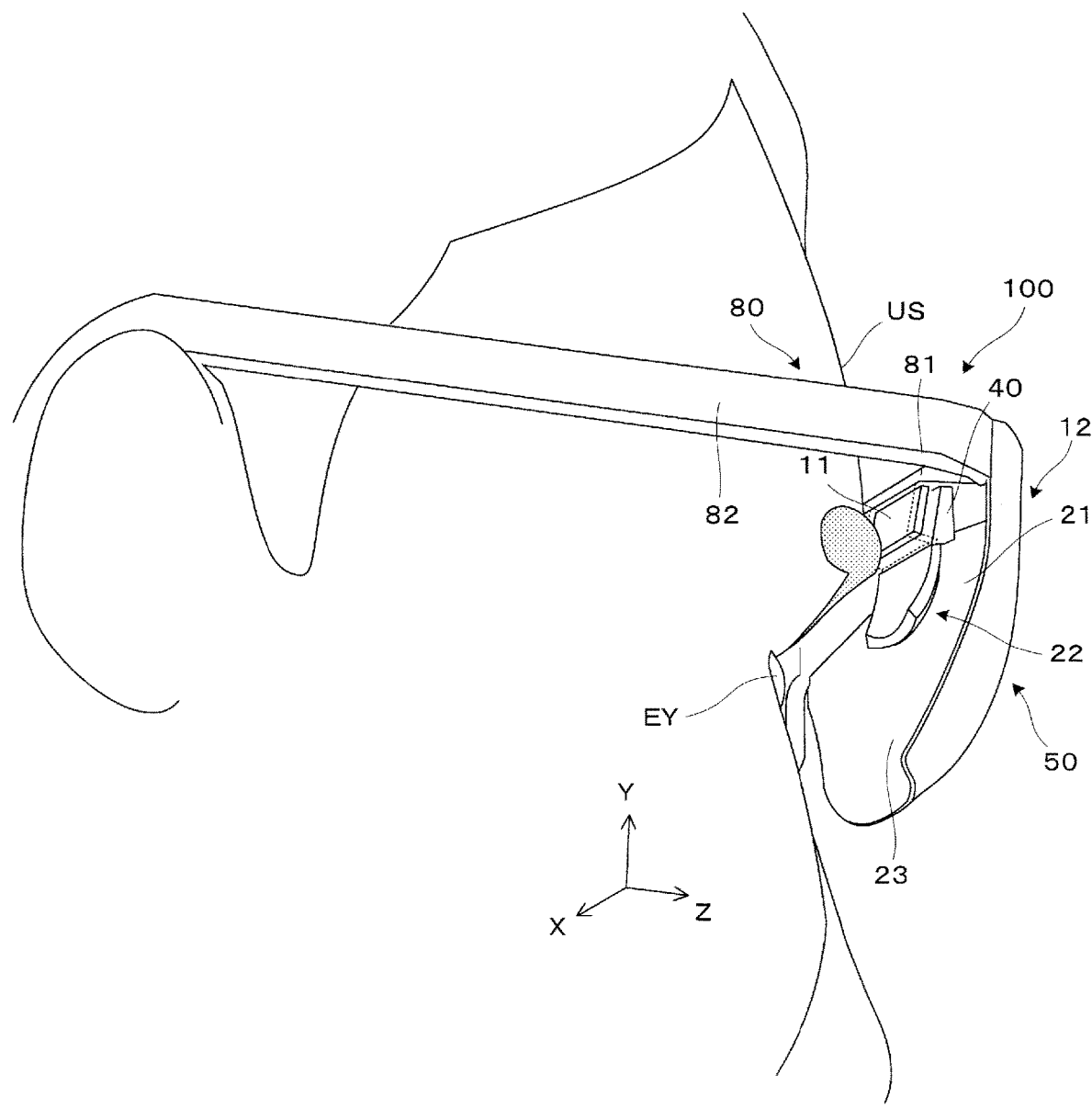
FIG. 2 is a perspective view illustrating the virtual image display apparatus according to First Exemplary Embodiment when viewed from diagonally below.
Figure 3:
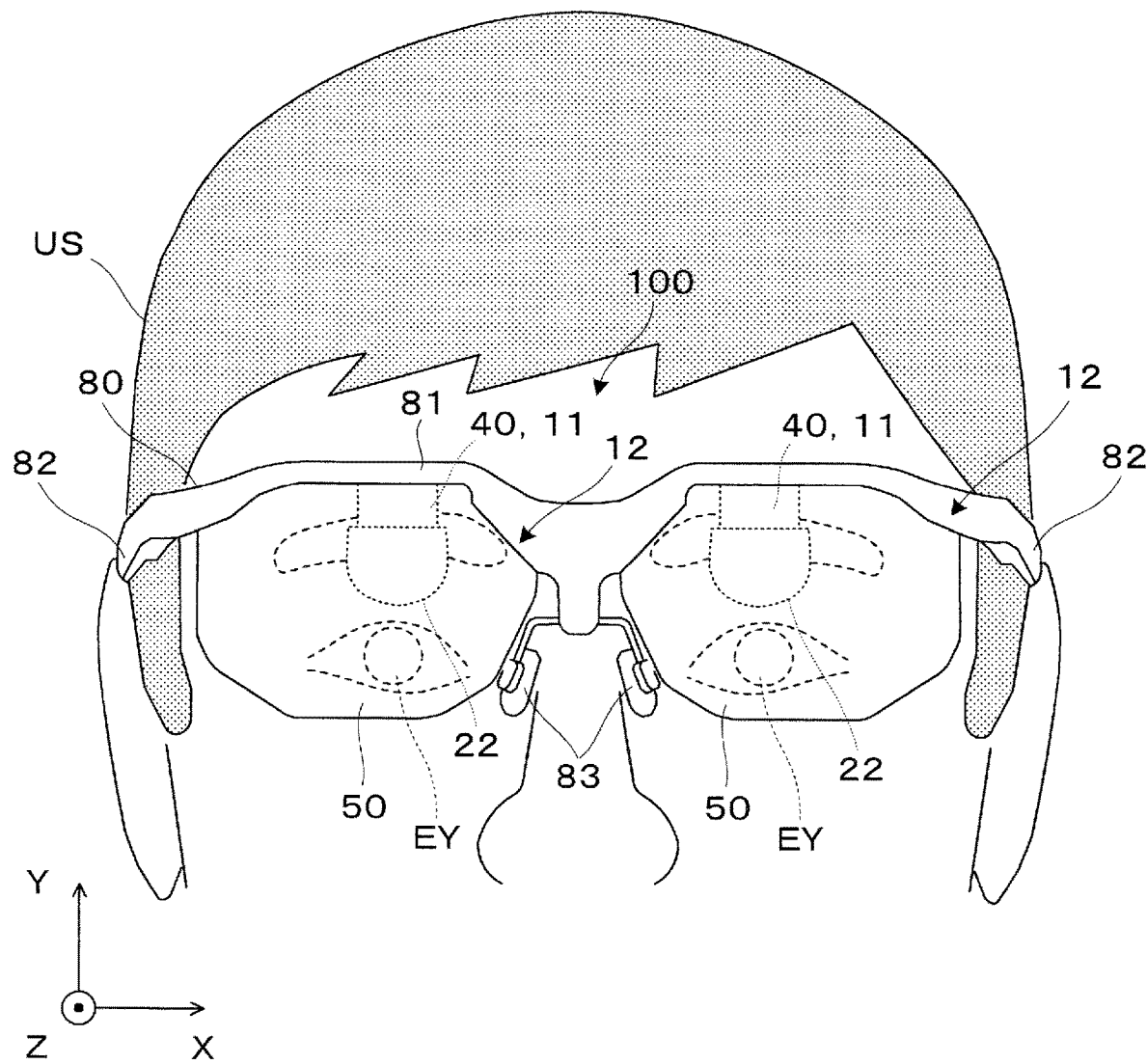
FIG. 3 is a front view illustrating the virtual image display apparatus according to First Exemplary Embodiment.

In FIGS. 1 to 3, X, Y and Z are an orthogonal coordinate system, an X direction corresponds to a lateral direction in which both eyes of an observer US wearing a virtual image display apparatus 100 are aligned, a Y direction corresponds to an upward direction orthogonal to the lateral direction in which both eyes of the observer US are aligned, and a Z direction corresponds to a front direction of the observer US or a front surface direction.

The illustrated virtual image display apparatus 100 is a head-mounted display, and causes the observer US to recognize a video as a virtual image. The virtual image display apparatus 100 includes a display device 11 and a projection optical system 12. The projection optical system 12 includes a lens 40, a first mirror member 21, a second mirror member 22, and a third mirror member 23. The display device 11, the lens 40, and the second mirror member 22 are integrally fixed and are supported by a body member 81 of a frame 80 on an upper portion. Further, the first mirror member 21 and the third mirror member 23 are connected to each other and constitute an integral appearance member 50, and are supported by the body member 81 of the frame 80 on the upper portion and a side portion. The appearance member 50 is disposed in a state of being positioned with respect to the display device 11, the lens 40, and the second mirror member 22 on an outer side or an external side with respect to the display device 11 and the like. The appearance member 50 has an outline having a shape of eyeglasses, and has a curved shape being convex outward over eyes of the observer US. Note that FIG. 1 and the like illustrate only the virtual image display apparatus 100 for the right eye, but the virtual image display apparatus 100 for the left eye has the same structure, and a virtual image display apparatus having an appearance like eyeglasses as a whole is formed by combining virtual image display apparatuses for both eyes. Note that, one of portions for the right eye and the left eye may be omitted from the virtual image display apparatuses for both eyes, and, in this case, a one-eye head-mounted display is obtained. In describing an overview of an optical path, imaging light GL emitted from the display device 11 passes through the lens 40, is reflected by the first mirror member 21, and is incident on the second mirror member 22. The imaging light GL incident on the second mirror member 22 is reflected by the second mirror member 22, and is then reflected by the third mirror member 23 of the transmissive type and is incident on a position of an exit pupil EP.

The frame 80 has a structure similar to that of eyeglasses, and includes a sidepiece portion 82 connected to a lateral end portion of the body member 81, and a nose pad 83 at a tip of a metal fitting extending from the center of the body member 81.

Figure 4:
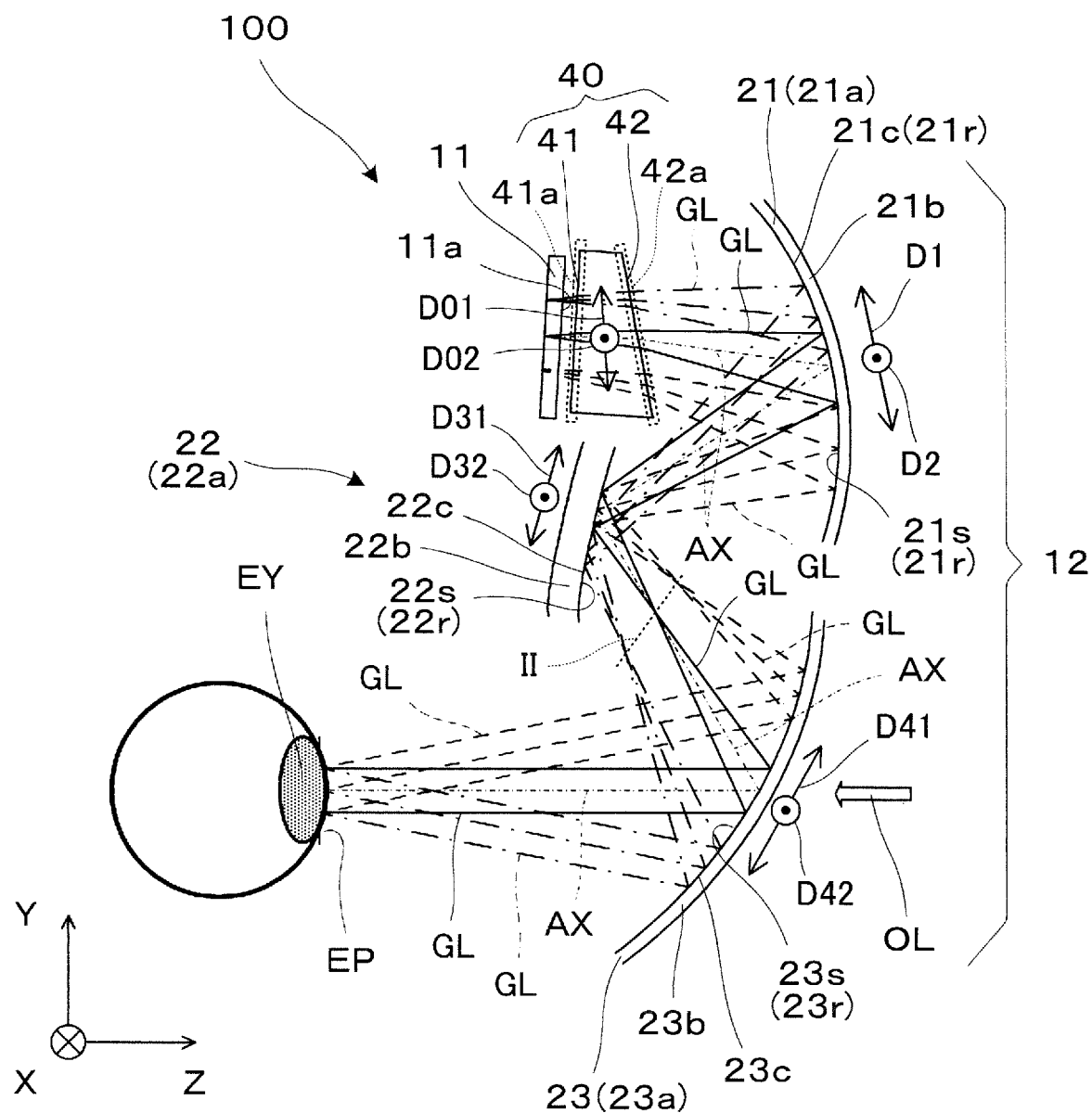
FIG. 4 is a side cross-sectional view illustrating an optical structure and the like of the virtual image display apparatus according to First Exemplary Embodiment.
Figure 5:
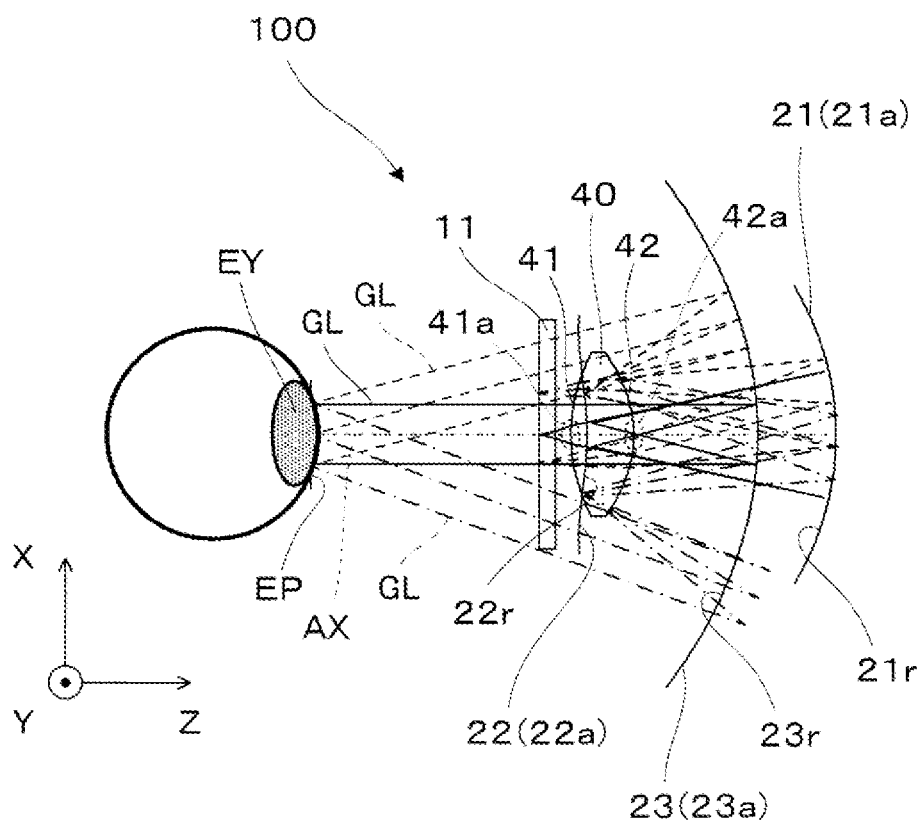
FIG. 5 is a plan view illustrating an optical structure and the like of the virtual image display apparatus according to First Exemplary Embodiment.

With reference to FIGS. 4 and 5, the display device 11 is an image forming unit, and is disposed on the upper side corresponding to a head side of the observer US or the +Y side with respect to the projection optical system 12. The display device (image forming unit) 11 is a self-luminous type display element typified by, for example, an organic electro-luminescence (organic EL), an inorganic EL, an LED array, an organic LED, a laser array, a quantum dot emission type element, and the like, and forms a still image or a moving image in color on a two-dimensional display surface 11a. The display device 11 is driven by a drive control circuit (not illustrated) and performs a display operation. When an organic EL display is used as the display device 11, the display device 11 is configured to include an organic EL control unit. When a quantum dot display is used as the display device 11, the display device 11 is configured to emit green or red color by causing light of a blue light emitting diode (LED) to pass through a quantum dot film. The display device 11 is not limited to a self-luminous display element, and may be constituted by an LCD or the other light modulating element, and may form an image by illuminating the light modulating element with a light source such as a backlight. As the display device 11, a liquid crystal on silicon (LCOS, LCoS is a trade name), a digital micro-mirror device, and the like may be used instead of the LCD.

Figure 6:
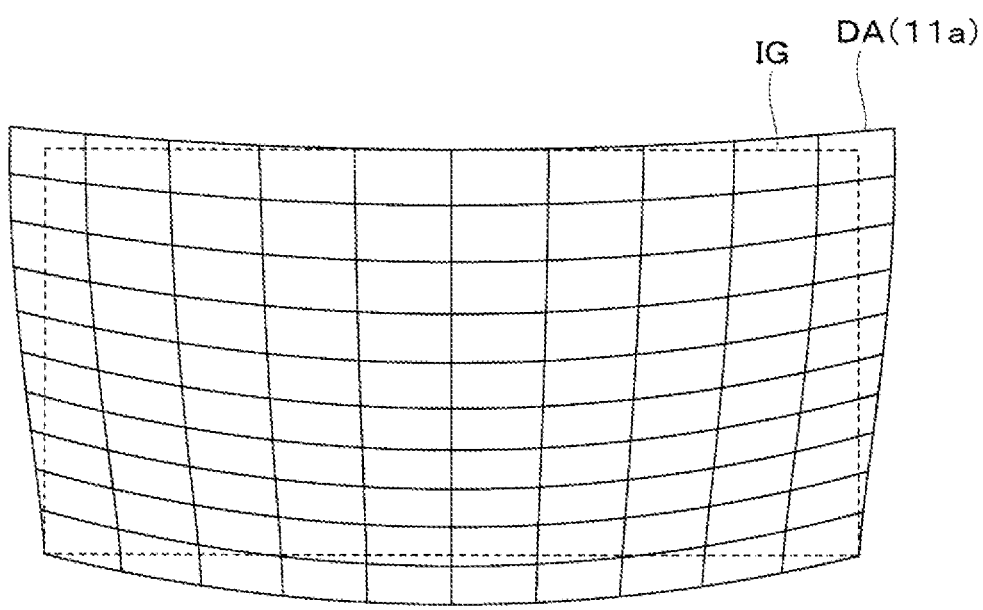
FIG. 6 is a diagram illustrating a compulsory distortion of a display image formed on a display device.

As illustrated in FIG. 6, a display image DA formed on the display surface 11a of the display device 11 is a modified image with a trapezoidal distortion as viewed from a distortion of a virtual grid. As described later, since the projection optical system 12 is an eccentric optical system, it is not easy to remove all distortion such as the trapezoidal distortion. Thus, even when the distortion remains in the projection optical system 12, by previously providing the display image DA formed on the display surface 11a with a distortion, a pixel array of a projected image IG of a virtual image observed in a position of the exit pupil EP via the projection optical system 12 can have a grid pattern, and an outline can be rectangular. As a result, the observer US can observe the projection image IG with less distortion, which facilitates correction of the other aberration in the projection optical system 12. The display image (modified image) DA formed on the display surface 11a may be a display image in which a compulsory distortion is formed by image processing. When the display surface 11a is rectangular, a margin is formed by forming a compulsory distortion, but additional information may be displayed in such a margin. The display image (modified image) DA formed on the display surface 11a is not limited to a display image in which a compulsory distortion is formed by image processing, and, for example, an array of display pixels formed on the display surface 11a may correspond to a compulsory distortion. In this case, image processing for correcting the distortion is not needed. Furthermore, the display surface 11a may be curved to correct an aberration.

Referring back to FIGS. 4 and 5, the projection optical system 12 is a non-coaxial optical system or an eccentric optical system on the assumption that oblique incidence is used. An eccentric direction of the projection optical system 12 is defined by the arrangement of the first mirror member 21, the second mirror member 22, and the like. Specifically, the lens 40, the first mirror member 21, the second mirror member 22, and the third mirror member 23 have the eccentric direction set within a YZ plane. In other words, an optical axis AX passing through the lens 40, the first mirror member 21, the second mirror member 22, and the third mirror member 23 is disposed along a plane that intersects the lateral direction in which a pair of pupils EY of an observer are aligned, i.e., the X direction and extends in a substantially vertical direction, and more specifically, is disposed along the YZ plane that is orthogonal to the X direction and extends in the vertical direction. The optical axis AX is disposed along the vertical YZ plane, and thus an angle of view in the lateral direction is easily increased. When a plane including the optical axis AX is inclined in a clockwise direction or a counterclockwise direction (i.e., left or right) around the Z axis by a few 10°, an influence on the angle of view is not greatly increased with the optical axis AX extending in the substantially vertical direction. Further, the lens 40 is disposed on the upper side or the +Y side of the first mirror member 21 corresponding to the head side of the observer US, the first mirror member 21 is disposed on the upper side or the +Y side of the second mirror member 22 corresponding to the head side of the observer US, and the second mirror member 22 is disposed on the upper side or the +Y side of the third mirror member 23 corresponding to the head side of the observer US. Herein, the upper side or the +Y side is considered, with an intersection or a point of contact of each of the mirror members 21, 22, and 23 and the optical axis AX serving as a reference.

Figure 7:
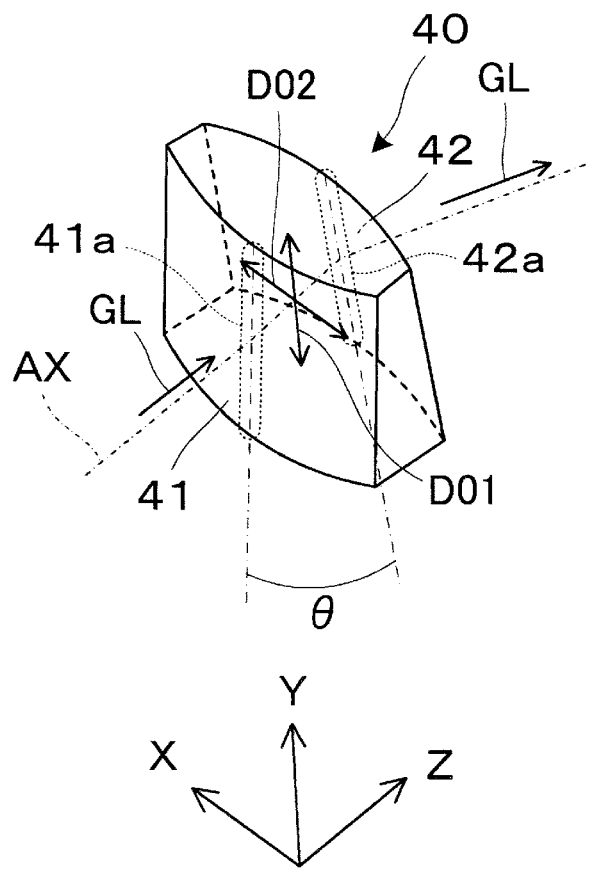
FIG. 7 is a perspective view illustrating a shape of a lens.
Figure 8:
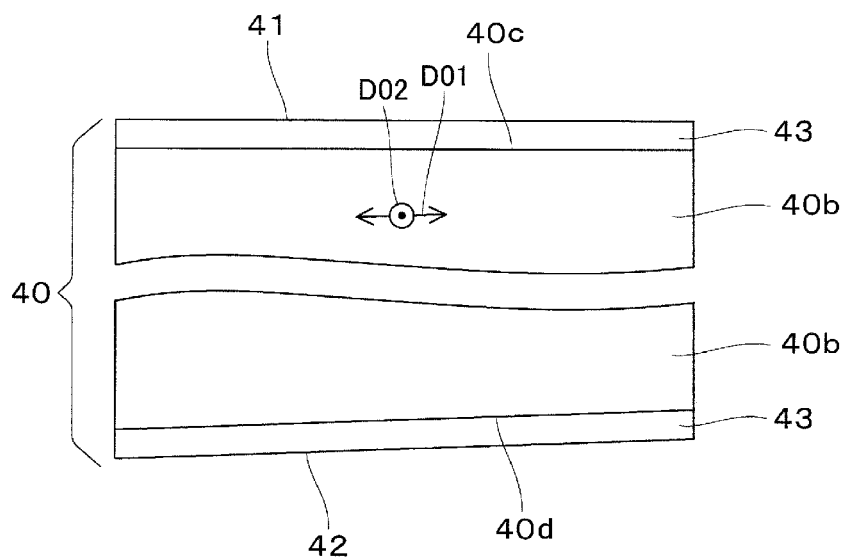
FIG. 8 is an enlarged cross-sectional view illustrating a structure of a refractive surface and the like of the lens.

As illustrated in FIG. 7, the lens 40 is a lens that is asymmetric in the vertical direction with different thicknesses at both upper and lower ends in the Y direction. The lens 40 includes lens surfaces 41 and 42, and refracts the imaging light GL from the display device 11. The lens 40 has a structure in which an antireflective coating 43 is formed on surfaces 40c and 40d of a base material 40b (see FIG. 8). Of the lens surfaces 41 and 42, at least the lens surface 42 is a free curved surface, but may also be an aspheric surface. Both of the lens surfaces 41 and 42 are asymmetric with respect to the optical axis AX in a first vertical direction D01 corresponding to the eccentric direction in the YZ plane, and is symmetric with respect to the optical axis AX in a second horizontal direction D02 or the X direction orthogonal to the first direction D01. Herein, the asymmetry in the first vertical direction D01 appears as inclinations of the pair of lens surfaces 41 and 42, that is, a difference or a bias in intersection angles of the pair of lens surfaces 41 and 42 with respect to a portion of the optical axis AX within the lens 40. On the other hand, the symmetry in the second horizontal direction D02 appears as a match of intersection angles of the pair of lens surfaces 41 and 42 with respect to a portion of the optical axis AX within the lens 40. The lens 40 is made of, for example, resin, but may also be made of glass. The refractive member 22b may be formed of a material having an Abbe number of greater than or equal to 50 in terms of suppressing occurrence of chromatic aberrations.

In the lens 40 described above, an aberration reduction can be achieved by setting the lens surfaces 41 and 42 to be free curved surfaces or an aspheric surfaces, and, particularly when the free curved surfaces are used, an aberration of the projection optical system 12 being a non-coaxial optical system or an eccentric optical system can be easily reduced. Note that the free curved surface is a surface without an axis of rotational symmetry, and various polynomials may be used as a surface function of the free curved surface. In addition, the aspheric surface is a surface having an axis of rotational symmetry, but is a paraboloid or a surface other than a spherical surface expressed by a polynomial.

The lens surfaces 41 and 42 of the lens 40 include a pair of flat surface regions 41a and 42a that are inclined to each other in a YZ cross section in the first direction D01 passing through the optical axis AX. Of the pair of flat surface regions 41a and 42a, the flat surface region 41a on the display device (image forming unit) 11 side is substantially orthogonal to the optical axis AX, but the flat surface region 41b on the first mirror member 21 side forms an angle of less than or equal to 10° with respect to the optical axis AX. As a result, the lens 40 has an action like a prism having a wedge angle θ in the first direction D01 in the entirety including the flat surface regions 41a and 42a, and corrects a trapezoidal distortion generated in the first mirror member 21, the second mirror member 22, and the like. In other words, since the projection optical system 12 is an eccentric optical system, a distorted warp such as a trapezoidal distortion is likely to occur, and a trapezoidal distortion generated in the first mirror member 21, the second mirror member 22, and the like can be canceled out by an inverted trapezoidal distortion of the lens 40, and a distorted warp of a projected image being a virtual image can be easily reduced. Note that it is difficult to eliminate a distorted warp with only the lens 40, and it is possible to form a projected image having a distorted warp being further reduced by combining the lens 40 with a technique for previously providing a distortion to the display image DA formed on the display surface 11a as described in FIG. 6.

The lens 40 has optical power in the first direction D01 smaller than optical power in the second direction D02. More specifically, the lens 40 has optical power in the first direction D01 that is less than or equal to 1/10 of optical power in the second direction D02. In the case of the present exemplary embodiment, the lens 40 has hardly any optical power in the cross section in the first direction D01 passing through the optical axis AX, but has positive optical power in the cross section in the second direction D02 passing through the optical axis AX. The lens 40 not only provides telecentricity on the display device (image forming unit) 11 side of the entire system in the cross section in the second direction D02 corresponding to the horizontal or X direction passing through the optical axis AX, but also provides telecentricity on the display device (image forming unit) 11 side of the entire system in the cross section in the first direction D01 corresponding to the vertical or Y direction passing through the optical axis AX. In other words, since the projection optical system 12 is an eccentric system with respect to the first vertical direction D01, correction of axial symmetry alone is difficult, and thus the inclined surface is also used in the lens 40 to secure telecentricity with respect to the vertical direction. On the other hand, since the projection optical system 12 is axially symmetric with respect to the second horizontal direction D02, telecentricity can be secured with only the positive power of the lens 40. Herein, a principal ray from the display device 11 is inclined in the outward direction when an angle of view increases, thus the lens 40 has positive power in the second horizontal direction D02. When a principal ray from the display device 11 is inclined in the inward direction, the lens 40 has negative power in the second horizontal direction D02. As described above, by providing telecentricity in vertical and horizontal, a change in magnification is less likely to occur due to positional shifting in the optical axis direction of the display device 11, which enables a focus adjustment by the display device 11.

Figure 9:
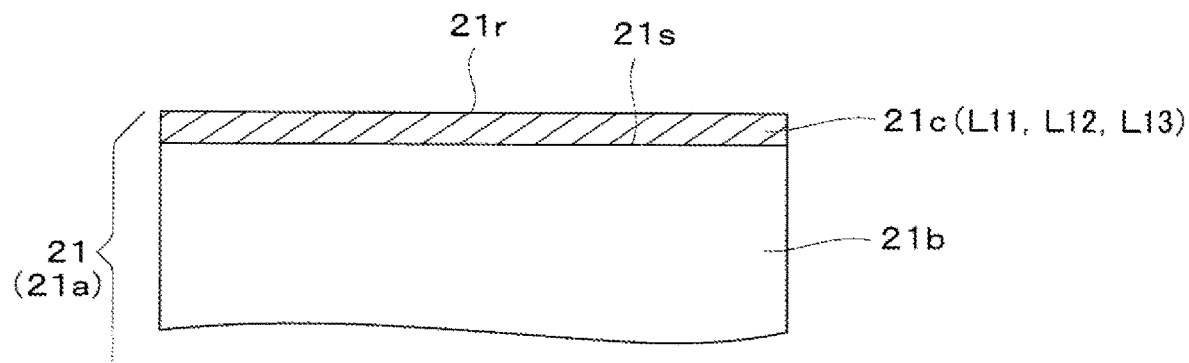
FIG. 9 is an enlarged cross-sectional view illustrating a structure of a reflecting surface and the like of a first mirror member.

With reference to FIG. 4 and the like, the first mirror member 21 is a plate-like component that functions as a concave surface mirror, and reflects the imaging light GL passing through the lens 40. In other words, the first mirror member 21 is a mirror plate 21a having a structure in which a mirror film 21c is formed on one surface 21s of a plate-like body 21b (see FIG. 9). A reflecting surface 21r of the first mirror member 21 is, for example, a free curved surface, and has a shape corresponding to a surface of the mirror film 21c or the surface 21s of the plate-like body 21b. The reflecting surface 21r is not limited to a free curved surface, and may be an aspheric surface. The reflecting surface 21r is asymmetric with respect to the optical axis AX in a first direction D1 corresponding to the eccentric direction in the YZ plane, and is symmetric with respect to the optical axis AX in a second direction D2 or the X direction orthogonal to the first direction D1. The plate-like body 21b of the first mirror member 21 is made of, for example, resin, but may also be made of glass. The mirror film 21c is formed of a single layer film L11 or a multilayer film L12 of metal such as Al and Ag, for example, but may also be a dielectric multilayer film L13. The mirror film 21c may be formed by lamination including a technique such as vapor deposition, but may also be formed by bonding a sheet-shaped reflective film.

Figure 10:
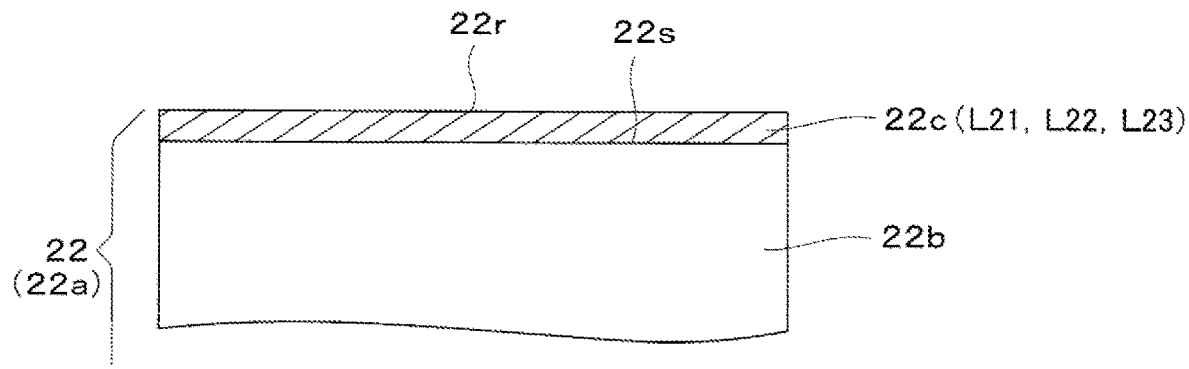
FIG. 10 is an enlarged cross-sectional view illustrating a structure of a reflecting surface and the like of a second mirror member.

The second mirror member 22 is a plate-like component that functions as a surface mirror, and reflects the imaging light GL from the first mirror member 21. In other words, the second mirror member 22 is a mirror plate 22a having a structure in which a mirror film 22c is formed on one surface 22s of a plate-like body 22b (see FIG. 10). A reflecting surface 22r being a mirror surface of the second mirror member 22 is, for example, a free curved surface, and has a shape corresponding to a surface of the mirror film 22c or the surface 22s of the plate-like body 22b. The reflecting surface (mirror surface) 22r is not limited to a free curved surface, and may be an aspheric surface. The reflecting surface 22r is asymmetric with respect to the optical axis AX in a first direction D31 corresponding to the eccentric direction in the YZ plane, and is symmetric with respect to the optical axis AX in a second direction D32 or the X direction orthogonal to the first direction D31. The plate-like body 22b of the second mirror member 22 is made of, for example, resin, but may also be made of glass. The mirror film 22c is formed of a single layer film L21 or a multilayer film L22 of metal such as Al and Ag, for example, but may also be a dielectric multilayer film L23. The mirror film 22c may be formed by lamination, but may also be formed by bonding a sheet-shaped reflective film.

Figure 11:
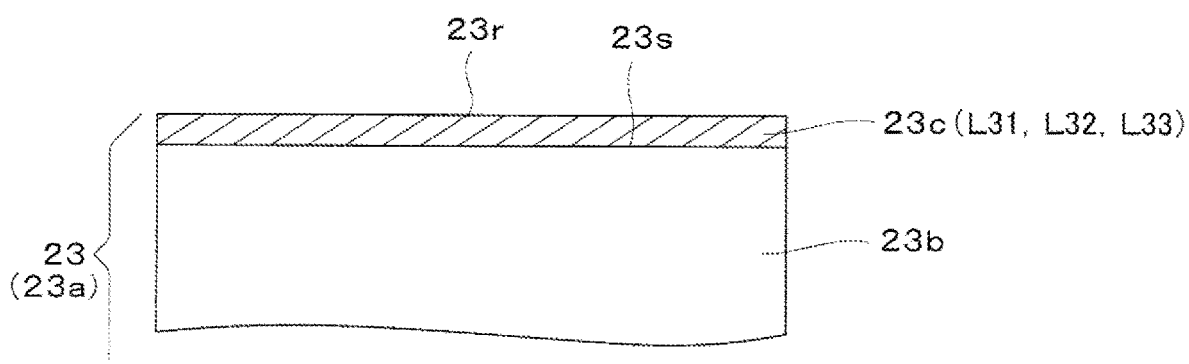
FIG. 11 is an enlarged cross-sectional view illustrating a structure of a reflecting surface and the like of a third mirror member.

The third mirror member 23 is a plate-like component that functions as a concave surface mirror, and reflects the imaging light GL from the second mirror member 22. The third mirror member 23 covers a position of the exit pupil EP in which the pupil EY is located, and also has a concave shape toward the position of the exit pupil EP. The third mirror member 23 is a mirror plate 23a having a structure in which a mirror film 23c is formed on one surface 23s of a plate-like body 23b (see FIG. 11). A reflecting surface 23r of the third mirror member 23 is, for example, a free curved surface, and has a shape corresponding to a surface of the mirror film 23c or the surface 23s of the plate-like body 23b. The reflecting surface 23r is not limited to a free curved surface, and may be an aspheric surface. The reflecting surface 23r is asymmetric with respect to the optical axis AX in a first direction D41 corresponding to the eccentric direction in the YZ plane, and is symmetric with respect to the optical axis AX in a second direction D42 or the X direction orthogonal to the first direction D41.

The third mirror member 23 is a transmissive type reflection element that allows transmission of a part of light upon reflection, and the mirror film 23c of the third mirror member 23 has semi-transmissive property. As a result, external light OL passes through the third mirror member 23, thus see-through view of externals is enabled and a virtual image can be superimposed on an external image. At this time, when the plate-like body 23b has a thickness of less than or equal to approximately few millimeters, a change in magnification of the external image can be suppressed to low. A reflectance of the mirror film 23c with respect to the imaging light GL and the external light OL is set to be greater than or equal to 10% and less than or equal to 50% in a range of an incident angle of the assumed imaging light GL in terms of securing luminance of the imaging light GL and facilitating the observation of an external image by see-through. The plate-like body 23b of the third mirror member 23 is made of, for example, resin, but may also be made of glass. The mirror film 23c is formed of, for example, a dielectric multilayer film L31 including a plurality of dielectric layers having a film thickness adjusted. The mirror film 23c may also be a single layer film L32 or a multilayer film L33 of metal such as Al and Ag having a film thickness adjusted. The mirror film 22c may be formed by lamination, but may also be formed by bonding a sheet-shaped reflective film.

A distance between the second mirror member 23 and the position of the exit pupil EP and a distance between the third mirror member 23 and the position of the exit pupil EP are set to be greater than or equal to 14 mm along the optical axis AX on the emission side or the Z axis, and a space in which the eyeglasses are disposed is secured. An antireflective coating may be formed on an external side of the third mirror member 23.

As described above, an aberration reduction can be achieved by setting the reflecting surface 21r of the first mirror member 21, the reflecting surface 22r of the second mirror member 22, and the reflecting surface 23r of the third mirror member 23 to be a free curved surface or an aspheric surface, and, particularly when a free curved surface is used, an aberration of the projection optical system 12 being a non-coaxial optical system or an eccentric optical system can be easily reduced.

In describing the optical path, the imaging light GL from the display device 11 passes through the lens 40, is incident on the first mirror member 21, and is reflected at a high reflectance close to 100% by the reflecting surface 21r. The imaging light GL reflected by the first mirror member 21 is incident on the second mirror member 22 and reflected at a high reflectance close to 100% by the mirror surface 22r. The imaging light GL from the second mirror member 22 is incident on the third mirror member 23 and reflected at a reflectance of less than or equal to approximately 50% by the reflecting surface 23r. The imaging light GL reflected by the third mirror member 23 is incident on the exit pupil EP in which the pupil EY of the observer US is disposed. An intermediate image II is formed between the second mirror member 22 and the third mirror member 23. The first mirror member 21 is farther away from the intermediate image II than the second mirror member 22, and an area of the first mirror member 21 is greater than an area of the second mirror member 22. The intermediate image II is formed by appropriately enlarging an image formed on the display surface 11a of the display device 11. The intermediate image II does not intersect the reflecting surface 22r to avoid an influence of debris and the like adhering to the reflecting surface 22r. An angle of view observed in the position of the exit pupil EP is assumed to be about 48° diagonally.

The first mirror member 21, the second mirror member 22, and the third mirror member 23 described above are not limited to surface mirrors, and may be rear surface mirrors including the mirror films 21c, 22c, and 23c formed on rear surfaces of the plate-like bodies 21b, 22b and 23b.

According to the virtual image display apparatus 100 in First Exemplary Embodiment described above, the lens 40 is asymmetric with respect to the optical axis AX in the first direction D01 corresponding to the eccentric direction defined by the first mirror member 21 and the second mirror member 22, and is symmetric with respect to the optical axis AX in the second direction D02 orthogonal to the first direction D01. Thus, the lens surfaces 41 and 42 of the lens 40 have a role of correcting an aberration conforming to the first direction and the second direction while being based on an eccentric mirror system including a plurality of mirrors, and resolution and the other optical performance can be increased over a wide angle of view.

Example 1

Hereinafter, Example 1 in which an optical system of the virtual image display apparatus 100 according to First Exemplary Embodiment was realized will be described. In data of Example 1, a free curved surface is expressed in an xy polynomial surface. A coefficient of the xy polynomial surface is given with z as an optical axial direction with the following equation:

$$z = \frac{cr^2}{1+\sqrt{1-(1+k)c^2 r^2}} + \sum_{j=2}^{66} C_j x^m y^n \quad j = \frac{(m+n)^2 + m + 3n}{2} + 1$$

where
z: sag amount of surface parallel to z axis
c: vertex curvature
k: conic coefficient
$C_j$: coefficient of monomial $x^m y^n$
r: distance in radius direction ($r=\sqrt{(x^2+y^2)}$).
Note that $C_i = C_j \times \{(\text{normalized radius})^{(m+n-1)}\}$.
Table 1 below is a table specifically describing a coefficient $C_i$.

TABLE 1

| SIGN | | MEANING |
| --- | --- | --- |
| C1 | k | CONIC CONSTANT |
| C2 | x | COEFFICIENT |
| C3 | y | COEFFICIENT |
| C4 | $x^2$ | COEFFICIENT |

TABLE 1-continued

| SIGN | | MEANING |
|---|---|---|
| C5 | $xy$ | COEFFICIENT |
| C6 | $y^2$ | COEFFICIENT |
| C7 | $x^3$ | COEFFICIENT |
| C8 | $x^2y$ | COEFFICIENT |
| C9 | $xy^2$ | COEFFICIENT |
| C10 | $y^3$ | COEFFICIENT |
| C11 | $x^4$ | COEFFICIENT |
| C12 | $x^3y$ | COEFFICIENT |
| C13 | $x^2y^2$ | COEFFICIENT |
| C14 | $xy^3$ | COEFFICIENT |
| C15 | $y^4$ | COEFFICIENT |
| C16 | $x^5$ | COEFFICIENT |
| C17 | $x^4y$ | COEFFICIENT |
| C18 | $x^3y^2$ | COEFFICIENT |
| C19 | $x^2y^3$ | COEFFICIENT |
| C20 | $xy^4$ | COEFFICIENT |
| C21 | $y^5$ | COEFFICIENT |
| C22 | $x^6$ | COEFFICIENT |
| C23 | $x^5y$ | COEFFICIENT |
| C24 | $x^4y^2$ | COEFFICIENT |
| C25 | $x^3y^3$ | COEFFICIENT |
| C26 | $x^2y^4$ | COEFFICIENT |
| C27 | $xy^5$ | COEFFICIENT |
| C28 | $y^6$ | COEFFICIENT |
| C29 | $x^7$ | COEFFICIENT |
| C30 | $x^6y$ | COEFFICIENT |
| C31 | $x^5y^2$ | COEFFICIENT |
| C32 | $x^4y^3$ | COEFFICIENT |
| C33 | $x^3y^4$ | COEFFICIENT |
| C34 | $x^2y^5$ | COEFFICIENT |
| C35 | $xy^6$ | COEFFICIENT |
| C36 | $y^7$ | COEFFICIENT |
| C37 | $x^8$ | COEFFICIENT |
| C38 | $x^7y$ | COEFFICIENT |
| C39 | $x^6y^2$ | COEFFICIENT |
| C40 | $x^5y^3$ | COEFFICIENT |
| C41 | $x^4y^4$ | COEFFICIENT |
| C42 | $x^3y^5$ | COEFFICIENT |
| C43 | $x^2y^6$ | COEFFICIENT |
| C44 | $xy^7$ | COEFFICIENT |
| C45 | $y^8$ | COEFFICIENT |

Figure 12:
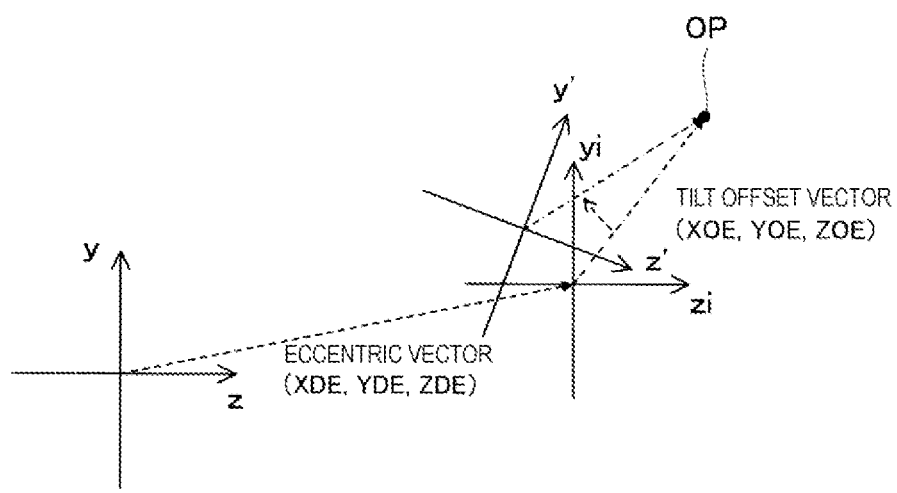
FIG. 12 is a conceptual diagram illustrating an eccentricity and a tilt of an optical surface.

FIG. 12 is a conceptual diagram illustrating an eccentricity and a tilt of an optical surface. The optical system in Example 1 was formed by combining an eccentricity and a tilt between optical surfaces. Specifically, coordinates (xi, yi, zi) were obtained by performing an operation of translation on original coordinates (x, y, z) by an eccentric vector (XDE, YDE, ZDE). Then, coordinates (x', y', z') to which the eccentricity and the tilt were provided by rotating the coordinates (xi, yi, zi) about a tilt offset point moved by a tilt offset vector (XOD, YOD, ZOD) with respect to an origin of the coordinates (xi, yi, zi) were obtained.

Table 2 below indicates parameters for each surface constituting the virtual image display apparatus of Example 1. A unit of a distance in the table is mm.

TABLE 2

| SURFACE NUMBER | SURFACE NAME | SURFACE TYPE | y CURVATURE RADIUS | SURFACE INTERVAL | MATERIAL | REFRACTION/ REFLECTION |
|---|---|---|---|---|---|---|
| IMAGE | | SPHERE | 0 | INFINITE | | REFRACTION |
| APERTURE | | SPHERE | 0 | 0 | | REFRACTION |
| 2 | | SPHERE | 0 | 33.7 | | REFRACTION |
| 3 | M1 | xy POLYNOMIAL SURFACE | −0.042 | −15.2 | | REFLECTION |
| 4 | | SPHERE | 0 | 0 | | REFRACTION |
| 5 | M2 | xy POLYNOMIAL SURFACE | −0.1 | 14.7 | | REFLECTION |
| 6 | | SPHERE | 0 | 0 | | REFRACTION |
| 7 | M3 | xy POLYNOMIAL SURFACE | −0.045 | 0 | | REFLECTION |
| 8 | | SPHERE | 0 | −18.1 | | REFRACTION |
| 9 | | SPHERE | 0 | 0 | | REFRACTION |
| 10 | | xy POLYNOMIAL SURFACE | 0 | −4.4 | RESIN A | REFRACTION |
| 11 | | xy POLYNOMIAL SURFACE | 0 | −1 | | REFRACTION |
| 12 | | SPHERE | 0 | −1.1 | SILICA | REFRACTION |
| 13 | | SPHERE | 0 | 0 | | REFRACTION |
| OBJECT | | SPHERE | 0 | 0 | | REFRACTION |

In the table, "image" means the exit pupil EP, and "object" means the display surface 11a of the display device 11. In this case, a light beam is followed from the exit pupil EP toward the display surface 11a. M1 to M3 being the surface names respectively mean the reflecting surface 23r of the third mirror member 23, the reflecting surface 22r of the second mirror member 22, and the reflecting surface 21r of the first mirror member 21. Table 2 describes the vertical y curvature radius, the surface interval between adjacent surfaces, the material for the refractive medium, and the surface distinction that is the refraction or reflection. Note that, in the material for the refractive medium, the resin A means a resin material having a refractive index of approximately 1.51 in a visible range and an Abbe number of 56, and SILICA means a quartz glass having a refractive index of approximately 1.47 in the visible range.

Table 3 below is a table summarizing the coefficients $C_i$ of the polynomials that provide a free curved surface included in Example 1.

TABLE 3

|  | s3 | s5 | s7 | s10 | s11 |
|---|---|---|---|---|---|
| NORMALIZED RADIUS | 10 | 10 | 10 | 10 | 10 |
| C1 | −1 | 0 | 0 | 0 | 0 |
| C2 | 0 | 0 | 0 | 0 | 0 |
| C3 | 0 | 0 | 0 | −2.6 | 0 |
| C4 | 0.064 | 2.315 | −0.242 | −6.39 | 4.603 |
| C5 | 0 | 0 | 0 | 0 | 0 |
| C6 | 0.556 | 5.61 | −0.139 | 0 | 0 |
| C7 | 0 | 0 | 0 | 0 | 0 |
| C8 | 0 | 0 | 0 | 0 | 0 |
| C9 | 0 | 0 | 0 | 0 | 0 |
| C10 | 0.653 | 0.31 | −0.38 | 0 | 0 |
| C11 | −0.023 | 4.859 | −0.017 | 0 | 0 |
| C12 | 0 | 0 | 0 | 0 | 0 |
| C13 | −0.027 | 4.168 | −0.002 | 0 | 0 |
| C14 | 0 | 0 | 0 | 0 | 0 |
| C15 | 0.339 | 1.227 | 0.578 | 0 | 0 |
| C16 | 0 | 0 | 0 | 0 | 0 |
| C17 | 0 | 0 | 0 | 0 | 0 |
| C18 | 0 | 0 | 0 | 0 | 0 |
| C19 | 0.009 | −0.632 | −0.038 | 0 | 0 |
| C20 | 0 | 0 | 0 | 0 | 0 |
| C21 | 0.0751 | −1.5417 | −0.3334 | 0 | 0 |
| C22 | 0 | 0 | 0.016 | 0 | 0 |
| C23 | 0 | 0 | 0 | 0 | 0 |
| C24 | 0 | 0 | −0.009 | 0 | 0 |
| C25 | 0 | 0 | 0 | 0 | 0 |
| C26 | 0 | 0 | 0 | 0 | 0 |
| C27 | 0 | 0 | 0 | 0 | 0 |
| C28 | 0 | 3.056 | 0.073 | 0 | 0 |

In the table, the symbols s3, s5, s7, s10, and s11 correspond to the surface numbers of Table 2. s3 means the reflecting surface 23r of the third mirror member 23. s5 means the reflecting surface 22r of the second mirror member 22. s7 means the reflecting surface 21r of the first mirror member 21. s10 and s11 mean the pair of lens surfaces 41 and 42 constituting the lens 40. Note that the numerical value of the coefficient is expressed by using the normalized curvature radius.

Table 4 below is a table summarizing an eccentricity and a tilt of an optical surface included in Example 1. A unit of a distance is mm, and a unit of an angle is ° (degree) in the table.

TABLE 4

|  | s3 | s5 | s7 | s10 |
|---|---|---|---|---|
| x COORDINATE | 0 | 0 | 0 | 0 |
| y COORDINATE | 13.09 | 4.13 | 2.484 | 7.99 |
| z COORDINATE | 0 | 0 | 0 | 0 |
| ROTATE ABOUT x AXIS | −1.23 | −10.84 | −3.5 | 27.48 |
| ROTATE ABOUT y AXIS | 0 | 0 | 0 | 0 |
| ROTATE ABOUT z AXIS | 0 | 0 | 0 | 0 |

In the table, the symbols s3, s5, s7, and s10 indicate the same optical surfaces as shown in Table 2 or Table 3.

Second Exemplary Embodiment

Hereinafter, a virtual image display apparatus according to Second Exemplary Embodiment of the present disclosure will be described. Note that the virtual image display apparatus according Second Exemplary Embodiment is obtained by modifying a part of the virtual image display apparatus according to First Exemplary Embodiment, and descriptions on common portions are omitted.

Figure 13:
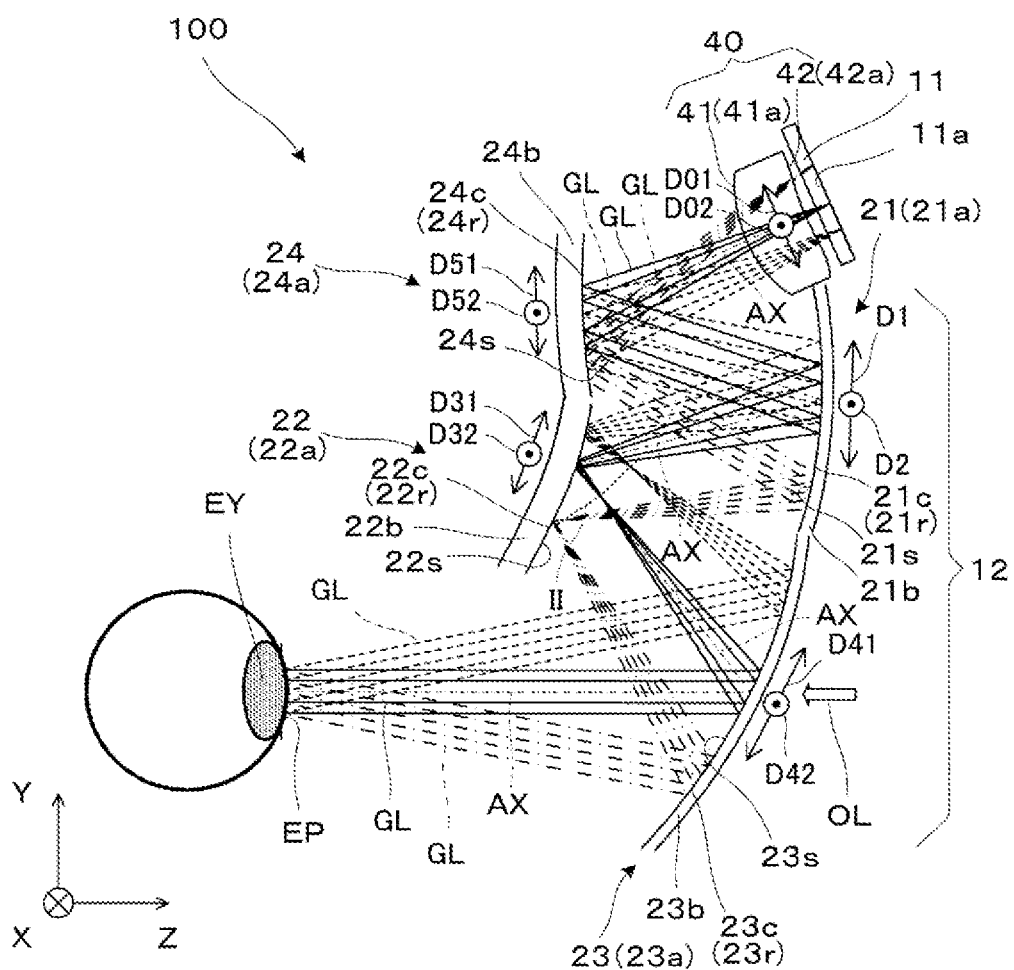
FIG. 13 is a side cross-sectional view illustrating an optical structure and the like of a virtual image display apparatus according to Second Exemplary Embodiment.
Figure 14:
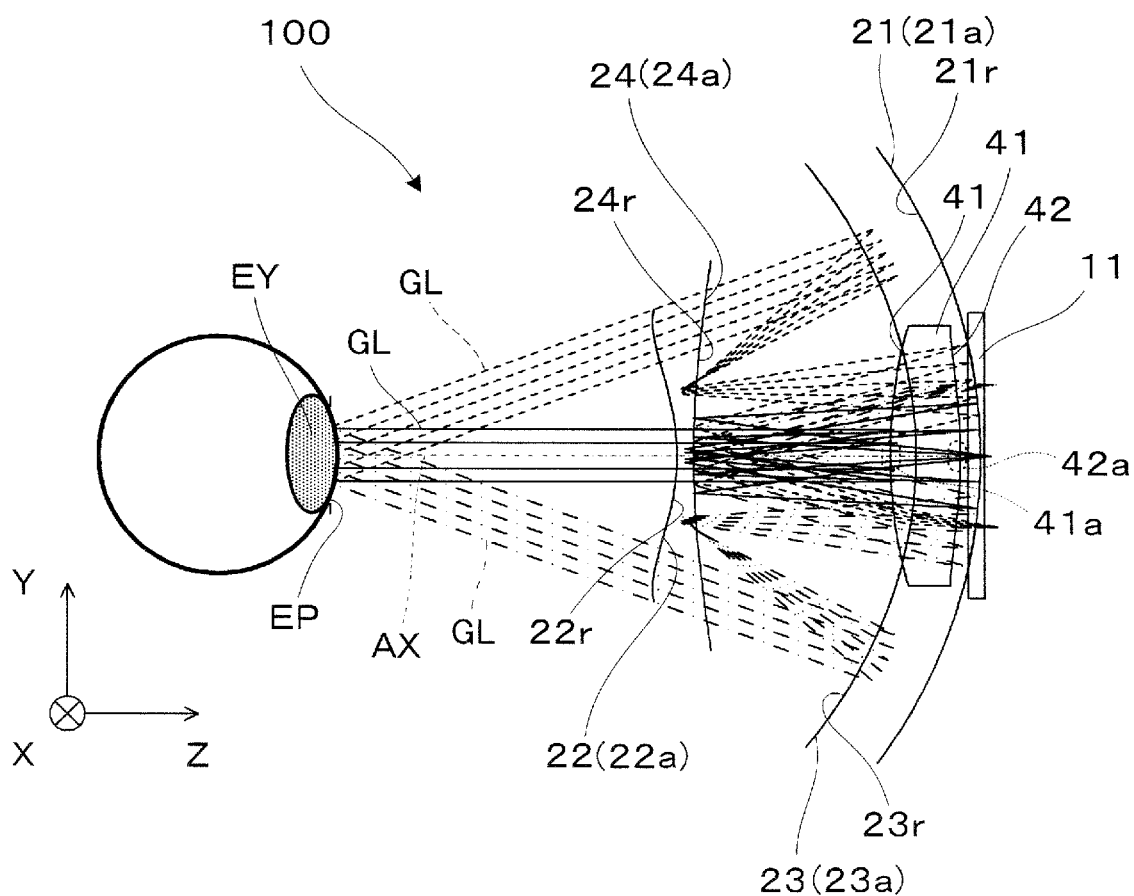
FIG. 14 is a plan view illustrating the optical structure and the like of the virtual image display apparatus according to Second Exemplary Embodiment.

As illustrated in FIGS. 13 and 14, a virtual image display apparatus 100 in Second Exemplary Embodiment includes, as a projection optical system 12, a lens 40, a first mirror member 21, a second mirror member 22, and a third mirror member 23, similar to First Exemplary Embodiment, but further includes a fourth mirror member 24 on an optical path between the lens 40 and the first mirror member 21.

The fourth mirror member 24 is a plate-like component that functions as a concave surface mirror. In other words, the fourth mirror member 24 is a mirror plate 24a having a structure in which a mirror film 24c is formed on one surface 24s of a plate-like body 24b. A reflecting surface 24r of the fourth mirror member 24 is, for example, a free curved surface, and has a shape corresponding to a surface of the mirror film 24c or the surface 24s of the plate-like body 24b. The reflection surface 24r is not limited to a free curved surface, and may be an aspheric surface. The reflecting surface 24r is asymmetric with respect to an optical axis AX in a first direction D51 corresponding to an eccentric direction in the YZ plane, and is symmetric with respect to the optical axis AX in a second direction D52 or the X direction orthogonal to the first direction D51. The plate-like body 24b of the fourth mirror member 24 is made of, for example, resin, but may also be made of glass. The mirror film 24c is made of, for example, metal, but may also be a dielectric multilayer film. Note that, unlike First Exemplary Embodiment, the second mirror member 22 functions as a convex mirror.

Lens surfaces 41 and 42 of the lens 40 are free curved surfaces, but have optical power around the optical axis AX in a first direction D01 and a second direction D02. However, the lens 40 has optical power in the first direction D01 smaller than optical power in the second direction D02. Further, the lens surfaces 41 and 42 are inclined to each other in the first vertical direction D01 passing through the optical axis AX. As a result, the lens surfaces 41 and 42 include a pair of flat surface regions 41a and 42a that are inclined to each other in a cross section in the first direction D01 passing through the optical axis AX. It is not clear from the drawings, but an interval between the lens surfaces 41 and 42 is narrower on the lower side of the lens 40. For example, when a coordinate tilt is provided around the X axis, or there is a difference in odd-order coefficients of a free curved surface, it can be said that the lens surfaces 41 and 42 are inclined to each other in the first vertical direction D01.

The first mirror member 21 and the third mirror member 23 are not limited to surface mirrors, and may be rear surface mirrors including mirror films 21c and 23c formed on rear surfaces of plate-like bodies 21b and 23b.

Example 2

Hereinafter, Example 2 in which an optical system of the virtual image display apparatus 100 according to Third Exemplary Embodiment was realized will be described. Data of Example 2 are also expressed in a manner similar to the data of Example 1, and redundant descriptions of the definitions and the like of the terms are omitted.

Table 5 below indicates parameters for each surface constituting the virtual image display apparatus of Example 2. A unit of a distance in the table is mm.

TABLE 5

| SURFACE NUMBER | SURFACE NAME | SURFACE TYPE | y CURVATURE RADIUS | SURFACE INTERVAL | MATERIAL | REFRACTION/REFLECTION |
|---|---|---|---|---|---|---|
| IMAGE | | SPHERE | 0 | INFINITE | | REFRACTION |
| APERTURE | | SPHERE | 0 | 0 | | REFRACTION |
| 2 | | SPHERE | 0 | 38.3 | | REFRACTION |
| 3 | M1 | xy POLYNOMIAL SURFACE | −0.0169 | −27.2 | | REFLECTION |
| 4 | | SPHERE | 0 | 0 | | REFRACTION |
| 5 | M2 | xy POLYNOMIAL SURFACE | −0.0454 | 0 | | REFLECTION |
| 6 | | SPHERE | 0 | 25.6 | | REFRACTION |
| 7 | M3 | xy POLYNOMIAL SURFACE | −0.0128 | −13.3 | | REFLECTION |
| 8 | | SPHERE | 0 | −5.5 | | REFRACTION |
| 9 | | SPHERE | 0 | 0 | | REFRACTION |
| 10 | M4 | xy POLYNOMIAL SURFACE | 0.0006 | 0 | | REFLECTION |
| 11 | | SPHERE | 0 | 0 | | REFRACTION |
| 12 | | SPHERE | 0 | 15.1 | | REFRACTION |
| 13 | | xy POLYNOMIAL SURFACE | 0.0933 | 4.7 | RESIN A | REFRACTION |
| 14 | | xy POLYNOMIAL SURFACE | −0.0351 | 0.9 | | REFRACTION |
| 15 | | SPHERE | 0 | 1.1 | SILICA | REFRACTION |
| OBJECT | | SPHERE | 0 | 0 | | REFRACTION |

In the table, M1 to M4 being the surface names respectively mean the reflecting surface 23r of the third mirror member 23, the reflecting surface 22r of the second mirror member 22, the reflecting surface 21r of the first mirror member 21, and the reflecting surface 24r of the fourth mirror member 24.

Table 6 below is a table summarizing the coefficients $C_i$ of the polynomials that provide a free curved surface included in Example 2.

TABLE 6

| | s3 | s5 | s7 | s10 | s13 | s14 |
|---|---|---|---|---|---|---|
| NORMALIZED RADIUS | 10 | 10 | 10 | 10 | 10 | 10 |
| C1 | −1 | 0 | 0 | 0 | 0 | 0 |
| C2 | 0 | 0 | 0 | 0 | 0 | 0 |
| C3 | 0 | 0 | 0 | 0 | 0 | 0 |
| C4 | −1.084 | 2.265 | −1.017 | 0.849 | −2.886 | 0 |
| C5 | 0 | 0 | 0 | 0 | 0 | 0 |
| C6 | −1.351 | 12.981 | −0.565 | 0.983 | −0.201 | 4.781 |
| C7 | 0 | 0 | 0 | 0 | 0 | 0 |
| C8 | 0 | 0 | 0 | 0 | 0 | 4.27 |
| C9 | 0 | 0 | 0 | 0 | 0 | 0 |
| C10 | −0.481 | −8.314 | 0.221 | −0.002 | −0.592 | 1.876 |
| C11 | −0.019 | 3.179 | −0.041 | −0.092 | −1.241 | 1.084 |
| C12 | 0 | 0 | 0 | 0 | 0 | 0 |
| C13 | −0.056 | −2.625 | 0.038 | −0.139 | 1.387 | −9.724 |
| C14 | 0 | 0 | 0 | 0 | 0 | 0 |
| C15 | −0.318 | 5.798 | 0.145 | −0.034 | 2.02 | −10.538 |
| C16 | 0 | 0 | 0 | 0 | 0 | 0 |
| C17 | 0 | 0 | 0 | 0 | 0 | 0 |
| C18 | 0 | 0 | 0 | 0 | 0 | 0 |
| C19 | −0.04 | −0.516 | 0.057 | 0 | 0 | 0 |
| C20 | 0 | 0 | 0 | 0 | 0 | 0 |
| C21 | −0.092 | −3.008 | 0.062 | 0 | 0 | 0 |
| C22 | −0.004 | 1.236 | −0.002 | 0 | 0 | 0 |
| C23 | 0 | 0 | 0 | 0 | 0 | 0 |
| C24 | −0.007 | −0.576 | −0.001 | 0 | 0 | 0 |
| C25 | 0 | 0 | 0 | 0 | 0 | 0 |
| C26 | −0.014 | 0.826 | 0.011 | 0 | 0 | 0 |
| C27 | 0 | 0 | 0 | 0 | 0 | 0 |
| C28 | −0.012 | 0.664 | 0.01 | 0 | 0 | 0 |

In the table, the symbols s3, s5, s7, s10, s13, and s14 correspond to the surface numbers in Table 5.

Table 7 below is a table summarizing an eccentricity and a tilt of an optical surface included in Example 2. A unit of a distance is mm, and a unit of an angle is ° (degree) in the table.

TABLE 7

|  | s3 | s5 | s6 | s7 | s10 | s11 |
|---|---|---|---|---|---|---|
| x COORDINATE | 0 | 0 | 0 | 0 | 0 | 0 |
| y COORDINATE | 18.53 | −10.58 | 14.8 | 32.02 | −1.11 | 2.9 |
| z COORDINATE | 0 | 0 | 0 | 0 | 0 | 0 |
| ROTATE ABOUT x AXIS | 8.95 | −6.72 | 25.77 | 12.2 | −21.83 | −5.22 |
| ROTATE ABOUT y AXIS | 0 | 0 | 0 | 0 | 0 | 0 |
| ROTATE ABOUT z AXIS | 0 | 0 | 0 | 0 | 0 | 0 |

In the table, the symbols s3, s5, s6, s7, s10, and s11 indicate the same optical surfaces as shown in Table 5 or Table 6.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the virtual image display apparatus 100 in the above-described exemplary embodiments, a self-luminous type display element such as an organic EL element is used as the display device 11. Instead, a configuration in which a laser scanner obtained by combining a laser light source and a scanner, such as a polygon mirror, may also be used as the display device 11.

A light control device that controls light by limiting transmitted light of the third mirror member 23 may be attached to the external side of the third mirror member 23. The light control device adjusts a transmittance, for example, electrically. Mirror liquid crystals, electronic shades, and the like may be used as the light control device. The light control device may adjust a transmittance according to external light brightness. When the light control device blocks the external light OL, only a virtual image that is not affected by an external image can be observed. Further, the virtual image display apparatus of the claimed disclosure is applicable to a so-called closed-type head-mounted display device (HMD) that blocks external light and causes only imaging light to be visually recognized. In this case, the HMD may also be compatible with a so-called see-through video product constituted by a virtual image display apparatus and an imaging device.

The mirror film 23c of the third mirror member 23 is not limited to the mirror film 23 having semi-transmissive property, and may be configured to reflect a specific polarization component, such as a wire grid element. The mirror film 23c of the third mirror member 23 may also be constituted by a volume hologram or the other hologram element, or may also be constituted by a diffraction grating.

In the description above, the virtual image display apparatus 100 is assumed to be mounted and used on a head, but the virtual image display apparatus 100 described above may also be used as a hand-held display that is not mounted on a head and is viewed into it like a pair of binoculars. In other words, the head-mounted display also includes a hand-held display in the present disclosure.

What is claimed is:

1. A virtual image display apparatus comprising:
   an image forming unit;
   a lens configured to refract imaging light from the image forming unit;
   a first mirror member configured to reflect imaging light that passed through the lens;
   a second mirror member configured to reflect the imaging light reflected by the first mirror member; and
   a third mirror member of a transmissive type configured to reflect the imaging light reflected by the second mirror member toward a position of an exit pupil, wherein
   the lens is asymmetric with respect to an optical axis in a first direction corresponding to an eccentric direction defined by the first mirror member and the second mirror member, and is symmetric with respect to the optical axis in a second direction orthogonal to the first direction,
   the lens provides telecentricity at the image forming unit side of an entire system in a cross section in the second direction passing through the optical axis, and
   the lens has positive optical power in the cross section in the second direction passing through the optical axis.

2. The virtual image display apparatus according to claim 1, wherein the lens has optical power smaller in the first direction than in the second direction.

3. The virtual image display apparatus according to claim 1, wherein the lens includes a pair of flat surface regions inclined to each other in a cross section in the first direction passing through the optical axis.

4. The virtual image display apparatus according to claim 3, wherein a flat surface region at the image forming unit side of the pair of flat surface regions of the lens is substantially orthogonal to the optical axis.

5. The virtual image display apparatus according to claim 1, wherein a reflecting surface of each of the first mirror member, the second mirror member, and the third mirror member is an aspheric surface or a free curved surface.

6. The virtual image display apparatus according to claim 1, wherein a lens surface of the lens is an aspheric surface or a free curved surface.

7. The virtual image display apparatus according to claim 1, wherein
   the first mirror member, the second mirror member, and the third mirror member each are a mirror plate having a structure in which a mirror film is formed on one surface of a plate-like body.

8. The virtual image display apparatus according to claim 1, further comprising a fourth mirror member in an optical path between the first mirror member and the lens.

9. The virtual image display apparatus according to claim 1, wherein the image forming unit displays a distorted modification image for correcting a distortion aberration by the lens, the first mirror member, the second mirror member, and the third mirror member.

10. The virtual image display apparatus according to claim 1, wherein the third mirror member covers a position of the exit pupil and has a shape concaved toward the exit pupil.

11. The virtual image display apparatus according to claim 1, wherein an optical axis passing through the lens, the first mirror member, the second mirror member, and the third mirror member is arranged along a plane extending in a substantially vertical direction intersecting a lateral direction in which a pair of pupils of an observer are aligned.

12. The virtual image display apparatus according to claim 11, wherein the first mirror member and the second mirror member are disposed at an upper side of the third mirror member to correspond to a head side of an observer.

13. The virtual image display apparatus according to claim 1, wherein an area of the first mirror member is greater than an area of the second mirror member.

14. The virtual image display apparatus according to claim 1, wherein the refractive member of the refractive reflective optical member includes a material having an Abbe number greater than or equal to 50.

15. The virtual image display apparatus according to claim 1, wherein a distance between the second mirror member and a position of the exit pupil is greater than or equal to 14 mm.

16. A virtual image display apparatus comprising:
an image forming unit;
a lens configured to refract imaging light from the image forming unit;
a first mirror member configured to reflect imaging light that passed through the lens;
a second mirror member configured to reflect the imaging light reflected by the first mirror member; and
a third mirror member of a transmissive type configured to reflect the imaging light reflected by the second mirror member toward a position of an exit pupil, wherein
the lens is asymmetric with respect to an optical axis in a first direction corresponding to an eccentric direction defined by the first mirror member and the second mirror member, and is symmetric with respect to the optical axis in a second direction orthogonal to the first direction, and
the lens includes a pair of flat surface regions inclined to each other in a cross section in the first direction passing through the optical axis.

* * * * *